(12) United States Patent
Ghanadan et al.

(10) Patent No.: US 8,583,585 B2
(45) Date of Patent: Nov. 12, 2013

(54) TRUST MANAGEMENT SYSTEM FOR DECISION FUSION IN NETWORKS AND METHOD FOR DECISION FUSION

(75) Inventors: Reza Ghanadan, Berkeley Heights, NJ (US); Kyle Guan, Wayne, NJ (US); Sintayehu Dehnie, Bexley, OH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 280 days.

(21) Appl. No.: 13/177,587

(22) Filed: Jul. 7, 2011
(Under 37 CFR 1.47)

(65) Prior Publication Data
US 2012/0066169 A1    Mar. 15, 2012

Related U.S. Application Data

(60) Provisional application No. 61/362,530, filed on Jul. 8, 2010.

(51) Int. Cl.
*G06F 9/44* (2006.01)
*G06N 7/02* (2006.01)
*G06N 7/06* (2006.01)

(52) U.S. Cl.
USPC ............................................. 706/52

(58) Field of Classification Search
USPC ............................................. 706/52
See application file for complete search history.

(56) References Cited

U.S. PATENT DOCUMENTS 8,284,738 B2 * 10/2012 Ghanadan et al. ............ 370/336
8,391,271 B2 *  3/2013 Mo et al. ...................... 370/350
8,442,023 B2 *  5/2013 Ghanadan et al. ............ 370/347

* cited by examiner

*Primary Examiner* — Michael B Holmes
(74) *Attorney, Agent, or Firm* — Daniel J. Long

(57) ABSTRACT

Disclosed is a trust management system for decision fusion in a network. The trust management system includes a detection subsystem having a plurality of sensors, and a plurality of channels. Each sensor of the plurality of sensors detects one of an occurrence and a non-occurrence of an event in the network. The trust management system further includes a fusion subsystem communicably coupled to the detection subsystem through the plurality of channels for receiving a decision of the each sensor and iteratively assigning a pre-determined weightage. The fusion subsystem ascertains a summation of respective decisions of the plurality of sensors and compares the weighted summation with a corresponding decision of the each sensor. The fusion subsystem further updates the assigned pre-determined weightage and determines the presence of the each sensor being one of a compromised sensor and a non-compromised sensor. Further disclosed is a method for decision fusion in a network.

20 Claims, 6 Drawing Sheets

TRUST MANAGEMENT SYSTEM FOR DECISION FUSION IN NETWORKS AND METHOD FOR DECISION FUSION

FIELD OF THE DISCLOSURE

The present disclosure generally relates to trust management in decision making. More particularly, the present disclosure relates to a system and a method for managing trust in collection, synthesis and interpretation of data, for decision fusion in a network.

BACKGROUND OF THE DISCLOSURE

Trust, with various components and derivatives thereof, plays a critical role in the collection, synthesis and interpretation of data, in a network. The collected, synthesized and interpreted data is transformed to knowledge that may aid in decision making process in various sectors such as defense, military, and the like.

Specifically, the various components and derivatives of the trust are derived from different contexts reflecting the intricacies of interactions among social-cognitive, information, and communication networks. As such, there is much complexity in fully understanding the different contexts as well as interdependency among the social-cognitive, information, and communication networks. Therefore, developing a composite notion of the trust and evaluating an impact thereof are fundamental to fully understand the different contexts and the interdependency, as the ability to achieve trust may greatly enhance effectiveness of the decision making process.

Accordingly, the role that the trust plays within the different contexts, such as in information networks, within a Tasking, Collection, Processing, Exploitation, and Dissemination (TCPED) chain is required to be investigated. In such different contexts, the composite notion of the trust as that of a trust component is derived and interpreted. Thereafter, the derived composite notion of the trust is tied to a particular stage of the TCPED chain. The TCPED chain is presented to a human or an automatic decision maker and decisions are then made based on a level of trust related to the received information in the particular stage of the TCPED chain. Further, due to sweeping complexities of evaluating the composite trust, data collection and decision fusion aspects of the TCPED chain are described.

The first stage in the TCPED chain is tasking. At this stage, various information (data) sources are mapped according to information needs and tasked with data collection. Suitable examples of the various information (data) sources include, but are not limited to, sensors (nodes), people, database queries, and the like. Further, ascertaining the authenticity of the various information (data) sources is important. For example, to ascertain the authenticity of the various information (data) sources some critical questions that act as indicators, such as whether the sensors (nodes) generating the data are trustworthy, may be evaluated. The track record of the sensors (nodes) generating the data may also be evaluated. Another question to be evaluated is whether there is a major deviation in behavior of the sensors (nodes) generating the data in the past. Any of the aforementioned indicators, if measured correctly, enable to determine a degree that the data generated may be trusted. With the completion of tasking stage, the data is collected, transported, and fused.

At such a stage, malicious entities may impact validity of the data generated by either replacing the data entirely or inserting faulty information (data). In addition, complexity of the data collection process is affected by underlying communication infrastructure of sensor (nodes) networks. Typically, the data generated is fused through a hierarchy of fusion subsystems. As such, the trust of information also includes trust of the fusion subsystems as well as the communication infrastructure having communication links connecting the fusion subsystems. Accordingly, the trust of information may be derived from the trust in the tasking, the information (data) sources, fusion hierarchy, the communication links, and the like. Therefore, the trust management for information fusion takes into account the various components and the different contexts. Further, information/data fusion exploits the synergy among the raw data and converts the raw data to knowledge to facilitate the decision making.

Various studies have been conducted to understand the sensor applications, including methods, algorithms, models, and architectures. Further, attempts have been made to understand/study concepts including information fusion for wireless sensor networks, optimal data fusion in multiple sensor detection systems, fusion of decisions transmitted over fading channels in wireless sensor networks, decision fusion rules in wireless sensor networks using fading channel statistics, learning the quality of sensor data in distributed decision fusion, and the like. However, in most of the aforementioned studies, all sensors are assumed to be "well-behaved", and the effect of compromised sensors on the fusion process is not considered.

It is also to be understood that the definitions of trust vary over different disciplines, e.g., computer science vs. social sciences, and the like. From the perspective of social science, the concept of trust centers on expectation of benevolent behaviors from others. Further, for a cross discipline view of trust, the expectation comes from interactions with trustees (ones to be trusted) over time. Such interactions allow the assessment of the consistency or discrepancy between expected and observed behaviors. Many recent studies involve works, such as with regard to trust models and trust evaluation metrics for ad-hoc networks, trust evaluation in anarchy for autonomous networks, and reputation-based framework for high integrity sensor networks. Further, aspects such as distributed reputation system for tracking applications in sensor networks that draw inspirations from the social aspects of trust and apply trust related concepts and methodologies to enhance the system integrity of peer-to-peer (P2P), mobile ad-hoc networks, sensor networks, and pervasive computing networks, have been studied. However, studies confined to trust models and trust evaluation metrics for ad-hoc networks focus on the evaluation of trust evidence in ad-hoc models. The evaluation process is modeled as a path problem on a directed graph, with nodes representing entities and edges representing trust relations. Further, two nodes in such models may establish an indirect trust relation without previous direct interaction. Furthermore, studies confined to trust evaluation in anarchy for autonomous networks involve analysis of the impact of distributed trust management—local voting rule on the structure and behavior of autonomous network. In addition, studies relating to reputation-based framework for high integrity sensor networks, and distributed reputation system for tracking applications in sensor networks, adopt a reputation system approach to mitigate the performance degradation caused by malicious nodes. Specifically, for the distributed reputation system for tracking applications in sensor networks, a reputation assignment mechanism has been developed for multi-object tracking application.

Based on the foregoing, most of the studies intent to focus a specific aspect of decision fusion in a network without considering the effect of compromised sensors, and fading and noisy communication channels; and addressing the threats originating due to the presence of the compromised sensors, and the fading and noisy communication channels for decision fusion.

Accordingly, there exists a need for efficiently and effectively managing trust for decision fusion within a network while considering the effect of compromised sensors, and fading and noisy communication channels, on the decision fusion; and addressing the threats of the compromised sensors, and the fading and noisy communication channels, in order to improve performance of a fusion process within the network.

SUMMARY OF THE DISCLOSURE

In view of the foregoing disadvantages inherent in the prior art, the general purpose of the present disclosure is to provide a trust management system and a method for decision fusion in a network, to include all advantages of the prior art, and to overcome the drawbacks inherent in the prior art.

An object of the present disclosure is to efficiently and effectively manage trust for decision fusion within a network while considering the effect of compromised sensors, and fading and noisy communication channels.

Another object of the present disclosure is to address the threats of the compromised sensors, and the fading and noisy communication channels, in order to improve performance of a fusion process within the network.

To achieve the above objects, in an aspect of the present disclosure, a trust management system for decision fusion in a network is disclosed. The trust management system includes a detection subsystem having a plurality of sensors. Each sensor of the plurality of sensors is configured to detect one of an occurrence and a non-occurrence of an event in the network. The each sensor of the plurality of sensors is further configured to perform a binary hypothesis testing for providing a decision based on the one of the occurrence and the non-occurrence of the event in the network. Further, the trust management system includes a plurality of channels. Each channel of the plurality of channels is communicably coupled to a corresponding sensor of the detection subsystem to receive the decision from the corresponding sensor and to further transmit the received decision. The trust management system further includes a fusion subsystem communicably coupled to the detection subsystem through the plurality of channels for receiving the transmitted decision of the each sensor and iteratively assigning a pre-determined weightage to the each sensor based on the decision. The fusion subsystem is configured to ascertain a summation of respective decisions of the plurality of sensors based on the pre-determined weightage for the each sensor and to compare the weighted summation of the respective decisions to a corresponding decision of the each sensor. The fusion subsystem is further configured to update the assigned pre-determined weightage corresponding to the each sensor based on the comparison of the weighted summation with the corresponding decision, and to determine the presence of the each sensor being one of a compromised sensor and a non-compromised sensor based on the comparison of the updated pre-determined weightage to a first threshold value.

In another aspect, the present disclosure provides a method for decision fusion in a network using a trust management system that includes a detection subsystem, a plurality of channels and a fusion subsystem. The method includes detecting one of an occurrence and a non-occurrence of an event in the network by each sensor of a plurality of sensors of the detection subsystem. The method further includes performing a binary hypothesis testing for providing a decision based on the one of the occurrence and the non-occurrence of the event in the network. Additionally, the method includes receiving and transmitting the decision of the each sensor by the plurality of channels communicably coupled to the detection subsystem. Further, the method includes receiving the transmitted decision of the each sensor by the fusion subsystem communicably coupled with the detection subsystem through the plurality of channels. Furthermore, the method includes iteratively assigning a pre-determined weightage to the each sensor based on the decision. The method also includes ascertaining a summation of respective decisions of the plurality of sensors based on the pre-determined weightage for the each sensor. The method further includes comparing the ascertained weighted summation of the respective decisions to a corresponding decision of the each sensor. Moreover, the method includes updating the assigned pre-determined weightage corresponding to the each sensor based on the comparison of the weighted summation with the corresponding decision. Additionally, the method includes determining the presence of the each sensor being one of a compromised sensor and a non-compromised sensor based on the comparison of the updated pre-determined weightage to a first threshold value.

These together with the other aspects of the present disclosure, along with the various features of novelty that characterize the present disclosure, are pointed out with particularity in the claims annexed hereto and form a part of the present disclosure. For a better understanding of the present disclosure, its operating advantages, and the specified objects attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of the drawings.

DETAILED DESCRIPTION OF THE DISCLOSURE

Figure 1:
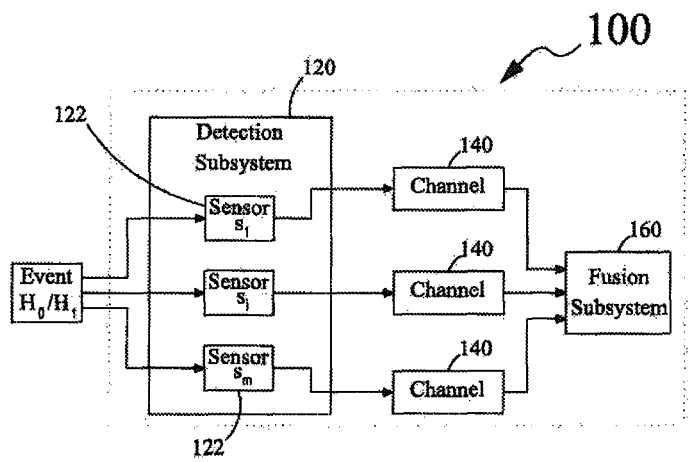
FIG. 1 illustrates a block diagram of a trust management system for decision fusion in a network, in accordance with an embodiment of the present disclosure.

The exemplary embodiments described herein in detail for illustrative purposes are subject to many variations in structure and design. It should be emphasized, however, that the present disclosure is not limited to a particular trust management system and a particular method for decision fusion in a network, as shown and described. It is understood that various omissions and substitutions of equivalents are contemplated as circumstances may suggest or render expedient, but these are intended to cover the application or embodiments without departing from the spirit or scope of the claims of the present disclosure. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof as well as additional items. Further, the terms, "first," "second," and the like, herein do not denote any order, elevation or importance, but rather are used to distinguish one aspect with respect to another. Furthermore, the terms, "a" and "an" herein do not denote a limitation of quantity, but rather denote the presence of at least one of the referenced item. Unless limited otherwise, the terms "coupled," and variations thereof herein are used broadly and encompass direct and indirect couplings.

In one aspect, the present disclosure provides a trust management system (hereinafter referred to as "system") for decision fusion in a network. The system includes a detection subsystem having a plurality of sensors. Each sensor of the plurality of sensors is configured to detect one of an occurrence and a non-occurrence of an event in the network. The each sensor of the plurality of sensors is further configured to perform a binary hypothesis testing for providing a decision based on the one of the occurrence and the non-occurrence of the event in the network. Further, the system includes a plurality of channels. Each channel of the plurality of channels is communicably coupled to a corresponding sensor of the detection subsystem to receive and transmit the decision from the corresponding sensor. The system further includes a fusion subsystem communicably coupled to the detection subsystem through the plurality of channels for receiving the decision of the each sensor and iteratively assigning a pre-determined weightage to the each sensor based on the decision. The fusion subsystem is configured to ascertain a summation of respective decisions of the plurality of sensors based on the pre-determined weightage for the each sensor and to compare the weighted summation of the respective decisions to a corresponding decision of the each sensor. The fusion subsystem is further configured to update the assigned pre-determined weightage corresponding to the each sensor based on the comparison of the weighted summation with the corresponding decision, and to determine the presence of the each sensor being one of a compromised sensor and a non-compromised sensor based on the comparison of the updated pre-determined weightage to a first threshold value. The system of the present disclosure is explained in detail in conjunction with FIGS. 1-8.

Referring to FIG. 1, a system 100 for decision fusion in a network (not shown) is provided. The network may be a social-cognitive network having various groups of people, leaders, tribes and the like. Such various groups of people, leaders, and tribes may have complex inter-relationships and perceptions. Further, the network may be an information network including news, articles, propaganda and different beliefs. Alternatively, the network may be a communication network built by utilizing high end/low end technology.

The system 100 includes a detection subsystem 120 as depicted in FIG. 1. The detection subsystem 120 further includes a plurality of sensors 122. Each sensor (such as a sensor $s_1$, sensor $s_i$, sensor $s_m$ depicted in FIG. 1) of the sensors 122 is configured to detect one of an occurrence and a non-occurrence of an event in the network. Specifically, the each sensor of the sensors 122 detects one of the occurrence of the event as "$H_1$" and the non-occurrence of the event as "$H_0$", as depicted in FIG. 1, in the network by mapping a plurality of information sources (not shown) associated with the network. For example, each information source of the plurality of information sources associated with the network may be a person, a sensor, a database query and the like.

Moreover, the each sensor of the sensors 122 is configured to perform a binary hypothesis testing for providing a decision based on the one of the occurrence and the non-occurrence of the event in the network. Further, the each sensor of the sensors 122 ascertains apriori probabilities of the one of the occurrence and the non-occurrence of the event based on the binary hypothesis testing. For example, hypotheses relating to the non-occurrence and occurrence of the event are denoted by $H_0$ and $H_1$, respectively. Accordingly, the apriori probabilities of the two hypotheses are denoted by, $\Pr(H_0) = P_0$, and $\Pr(H_1) = P_1$.

Further, an observation corresponding to the event at a sensor "i" of the sensors 122 is denoted by $r_i$. It is assumed that observations at the each sensor of the sensors 122 are statistically independent. A conditional probability function based on the foregoing is denoted by $f(r_i|H_j)$, with $i=1, \ldots, M$ and $j=0, 1$, where M is total count (number) of the sensors 122. The term "count" hereinafter may interchangeably be referred to as "number".

At the each sensor of the sensors 122, a rule is employed to make a decision $u_i$, $i=1, \ldots, M$, where $$u_i = \begin{cases} -1 & \text{if an event is absent } (H_0); \\ 1 & \text{if an event is present } (H_1). \end{cases} \tag{1}$$

For further calculations, a zero mean additive and white Gaussian (AWG) noise process is assumed. Therefore, the hypotheses test (binary hypothesis testing) takes the following form:

$$H_0 : r_i = n_i \tag{2}$$

$$H_1 : r_i = s_i + n_i \tag{3}$$

In the above equation (3), $s_i$ represents a signal vector at the sensor "i" under hypothesis $H_1$. Under both hypotheses, $n_i$ represents additive noise component that is added to the sensor "i". Thereafter, a decision is made at the sensor "i", based on a Likelihood Ratio Test (LRT):

$$\frac{f_{r_i|H_1}(r_i)}{f_{r_i|H_0}(r_i)} \geq \eta. \tag{4}$$

Based on the above equation (4), a second threshold value $\eta$ is ascertained utilizing the ascertained apriori probabilities of the one of the occurrence and the non-occurrence of the event (hypotheses, $P_0$ and $P_1$).

Further, when noise is described by zero mean, additive and stationary Gaussian process with co-variance matrix $C_i = E\{n^T_i n_i\}$, the binary hypothesis testing reduces to the following form:

$$l = r_i^T C_i^{-1} s_i \gtreqless \eta \triangleq \ln(\eta) + \frac{1}{2} s_i^T C_i^{-1} s_i. \quad (5)$$

In the above equation (5), parameter 1 is referred to as sufficient statistics and represents a summary operation performed for decision fusion by the system 100, on a plurality of measurements of $r_i$. Finally, a sgnal-to noise ratio (SNR) for the sensor "i" is obtained as follows:

$$\psi^2 = s_i^T C_i^{-1} s_i \quad (6)$$

Accordingly, the each sensor of the sensors 122 ascertains a probability of detection "$P_d$" and a probability of false alarm "$P_f$" corresponding to the one of the occurrence and the non-occurrence of the event in the network. Moreover, the probability of detection "$P_d$" and the probability of false alarm "$P_f$" are considered as quantifiable attributes for quality of information (QoI) of the each sensor of the sensors 122. The probability of detection "$P_d$" and the probability of false alarm "$P_f$" are ascertained, for a special case where the AWG noise process has a zero mean and a variance of $\sigma_2$, as follows:

$$P_d = 1 - \Phi\left(\frac{\ln(\eta)}{\psi} - \frac{\psi}{2}\right), \quad (7)$$

$$P_f = 1 - \Phi\left(\frac{\ln(\eta)}{\psi} + \frac{\psi}{2}\right), \quad (8)$$

In the above equations (7) and (8), $\Phi(\cdot)$ is the cumulative distribution function of a N(0, 1) random variable and square of the parameter $\psi$ is reflective of the SNR and has a following form:

$$\psi^2 = \frac{s_i^T s_i}{\sigma^2}. \quad (9)$$

Referring again to FIG. 1, the system 100 also includes a plurality of channels 140. Each channel of the channels 140 is communicably coupled to a corresponding sensor of the sensors 122 of the detection subsystem 120, to receive and transmit the decision from the corresponding sensor. Further, the each channel of the channels 140 may be affected by a channel fading parameter and a channel noise within the system 100. Alternatively, the each channel of the channels 140 may be associated with perfect channel conditions, and accordingly, transmits the decision from the corresponding sensor without any error (i.e., the effect of channel fading and channel noise is zero).

The system 100 further includes a fusion subsystem 160. The fusion subsystem 160 is communicably coupled to the detection subsystem 120 through the channels 140 for receiving the decision of the each sensor. The decision of the each sensor of the sensors 122 may be received in the form of a report by the fusion subsystem 160.

The fusion subsystem 160 further iteratively assigns a pre-determined weightage to the each sensor based on the decision. The fusion subsystem 160 is further configured to ascertain a summation of respective decisions of the sensors 122 based on the pre-determined weightage for the each sensor. Specifically, the fusion subsystem 160 applies weighted sum fusion rule (that is Bayesian optimal) for assigning pre-determined weightages and ascertaining summation as follows:

$$f(u_1, \ldots, u_2) = \begin{cases} 1, & \text{if } a_0 + \sum_{i=1}^{M} a_i u_i > 0; \\ -1, & \text{otherwise.} \end{cases} \quad (10)$$

In the above equation (10), $f(u_1, \ldots, u_M)$ represents data fusion rules that often take the form of "k out of n" or "majority vote" logical functions. Further, the optimum pre-determined weightages (weights) are given by:

$$a_0 = \frac{P_1}{P_0} \quad (11)$$

$$a_i = \begin{cases} \log \frac{1 - p_{mi}}{p_{fi}}, & \text{if } u_i = 1; \\ \log \frac{1 - p_{fi}}{p_{mi}}, & \text{if } u_i = -1. \end{cases} \quad (12)$$

The assigning of the pre-determined weightage by the fusion subsystem 160 (and specifically, by the data fusion rules) is based on the each sensor's QoI. For example, weightage of the sensor "i" is a function of "$P_{mi}$", where "$P_{mi}$" ($P_{mi}=1-P_{di}$; where, $P_{di}$ is probability of detection at the sensor "i") is probability of no detection at the sensor "i"; and "$P_{fi}$", where "$P_{fi}$" is probability of false alarm by the sensor "i". Further, the pre-determined weightage reflects trustworthiness as well as reliability of the report from the sensor "i". Based on the foregoing, a probability of detection of the fusion subsystem 160 is ascertained in order to assign pre-determined weightages and to perform summation as follows:

$$P_d^{Fus} = Pr(f(u_1, \ldots, u_n) = 1 \mid H_1) \quad (13)$$
$$= Pr\left(a_0 + \sum_{i=1}^{M} a_i u_i > 0 \mid H_1\right).$$

In the above equation (13), "$P^{Fus}_d$" is the probability of detection of the fusion subsystem 160 and is ascertained by analyzing QoI of the fusion subsystem 160. The QoI of the fusion subsystem 160 is a function of parameters, "$P_{di}$" and "M" that reflects the total count of sensors. In above ascertained equation (13), "$u_i$" is a discrete random variable with following probability mass function (PMF):

$$P(u_i \mid H_1) = \begin{cases} 1 & \text{with probability } P_{d_i}; \\ -1 & \text{with probability } 1 - P_{d_i}. \end{cases} \quad (14)$$

In the above equation (14), it is assumed that $P_0 = P_1$, and $P_{di} = P_d$. Therefore, the probability of detection "$P^{Fus}_d$" of the fusion subsystem 160 is expressed as:

$$P_d^{Fus} = I_{1-P_d}(M - \lfloor M/2 \rfloor, 1 + \lfloor M/2 \rfloor) \quad (15)$$

In the above equation (15), $I_x(a, b)$ denotes regularized incomplete beta function.

Figure 2:
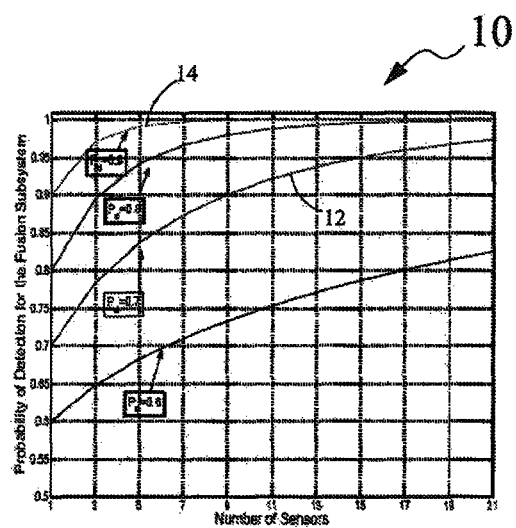
FIG. 2 illustrates a graph depicting a probability of detection of a fusion subsystem of the trust management system of FIG. 1, as a function of a count of sensors.

When both the cases (the occurrence and the non occurrence of the event) are equally probable and the each sensor of the sensors 122 is homogemous in both QoI and sensing environment, the fusion rule as described in equation (10) reduces to a rule of majority vote. For example, referring to FIG. 2, a graph 10 depicts a probability of detection of the fusion subsystem 160 (depicted by y-axis of the graph 10) as a function of the count of sensors 122 (depicted by x-axis of the graph 10). More specifically, FIG. 2 depicts that increase in the count (number) of sensors 122 enhances the probability of detection of the fusion subsystem 160 (i.e., QoI of the fusion subsystem 160) though the gain exhibits a diminishing return. FIG. 2 also depicts that a significantly high count of sensors 122 with low QoI (e.g., $P_d$=0.7, as depicted by a curve 12) are required more than those with high QoI (e.g., $P_d$=0.9, as depicted by a curve 14) to achieve a given probability of detection of the fusion subsystem 160.

Further, the fusion subsystem 160 compares the weighted summation of the respective decisions to a corresponding decision of the each sensor of the sensors 122. For example, at a time step "j" (j≥1), the fusion subsystem 160 compares the weighted summation ("fused" decision) with the decision of the each sensor of the sensors 122. In particular, if the report (decision) from the sensor "i" is in conflict with the decision (weighted summation) of the fusion subsystem 160, the pre-determined weightage of the sensor "i" is decreased by a factor of $\theta$ (0≤$\theta$<1). If the report from the sensor "i" is same as the decision of the fusion subsystem 160, the pre-determined weightage of the sensor "i" is either unchanged (if $W_{i,j-1} \neq 1$, where $W_{i,j}$ is the assigned pre-determined weightage) or increased by a factor of $1/\theta$ (if $W_{i,j-1} \leq 1$).

Further, the fusion subsystem 160 is configured to update the assigned pre-determined weightage corresponding to the each sensor based on the comparison of the weighted summation as described above. The updated weightage is incorporated into a fusion process preformed by the fusion subsystem 160 at a time step "j+1", as follows:

$$f_j(u_1, \ldots, u_M) = \begin{cases} 1 & \text{if } a_0 + \sum_{i=1}^{M} W_{i,j-1} a_i u_i > 0; \\ -1 & \text{otherwise.} \end{cases} \quad (16)$$

Figure 3:
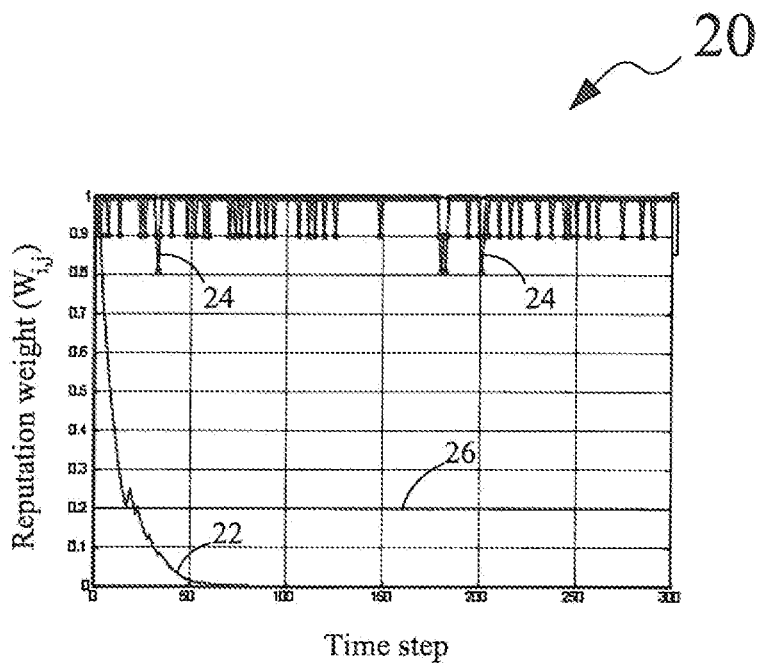
FIG. 3 illustrates a graph depicting a pattern of weightages for non-compromised and compromised sensors for a first set of conditions.

Additionally, the fusion subsystem 160 after updating the pre-determined weightage, determines the presence of the each sensor being one of a compromised sensor and a non-compromised sensor based on the comparison of the updated pre-determined weightage to a first threshold value "$W_{Thr}$". For example, FIG. 3 illustrates a graph 20 depicting a pattern of weightages for compromised and non-compromised sensors for a first set of conditions. Specifically, FIG. 3 depicts a time step on x-axis of the graph 20 and a reputation weight (pre-determined weightage) on y-axis of the graph 20. Further, in FIG. 3, total count of sensors shown is 15 (M=15) and among the 15 sensors three sensors are compromised ($M^{Fau}$=3). For FIG. 3, it is assumed that signal vector $s_i$=1 and the each sensor experiences the same variance of measurement errors, i.e., $\sigma$=0.5. Further, FIG. 3 demonstrates that the pre-determined weightage of the compromised sensors, as depicted by curve 22, and the non-compromised sensors, as depicted by peaks 24, evolve quite differently. The pre-determined weightage of the compromised sensor decreases as time progresses and eventually converges to 0. On the other hand, the weightage of the non-compromised sensor fluctuates from a value, such as 1, with certain deviation.

In FIG. 3, a threshold corresponding to the first threshold value "$W_{Thr}$" may be assigned, as depicted by a line 26. Accordingly, when the pre-determined weightage of any sensor of the sensors 122 is below the first threshold value "$W_{Thr}$", the sensor is declared compromised and a report from such compromised sensor is not included in the fusion process by the fusion subsystem 160. Moreover, the values of both the factor $\theta$ and the first threshold value "$W_{Thr}$" affect the time required as well as the accuracy to identify the compromised sensors by the fusion subsystem 160. A small factor $\theta$ and a large first threshold value "$W_{Thr}$" tends to shorten the time required to detect the compromised sensors, although at the possible cost of detection accuracy.

Further, the compromised sensors of the sensors 122 may exhibit malicious behavior. Such sensors may either intentionally increase an error of the measurement or falsely report respective decisions to the fusion subsystem 160. Accordingly, a deterministic approach for modeling a sensor's malicious behavior is described. Any sensor of the sensors 122 misbehaves when the sensor falsely reports a decision thereof with probability of 1.

$$u_i^f = \begin{cases} -1 & \text{if } u_i = 1 \\ 1 & \text{if } u_i = -1 \end{cases} \quad (17)$$

In the above equation (17), $u_i^f$ denotes the false report by the sensor "i".

To quantify the affect on the QoI of the fusion process performed by the fusion subsystem 160 by the presence of the compromised sensors, the probability of detection of the fusion subsystem 160 is evaluated. Without the loss of generality, it is assumed that sensors 1 to $M_{Fau}$ (total count of sensors of the sensors 122 that are compromised) are compromised. In this case, the probability of detection of the fusion subsystem 160 is as follows:

$$P_d^{Fus} = Pr\left(a_0 + \sum_{i=1}^{M_{Fau}} a_i u_i^f + \sum_{i=M_{Fau}+1}^{M} a_i u_i > 0 \,\middle|\, H_1\right) \quad (18)$$

In the above equation (18), $u_i^f$ under hypothesis $H_1$ is a discrete random variable with the following PMF:

$$P(u_i^f | H_1) = \begin{cases} 1 & \text{with probability } 1 - P_{d_i}; \\ -1 & \text{with probability } P_{d_i}. \end{cases} \quad (19)$$

Figure 4:
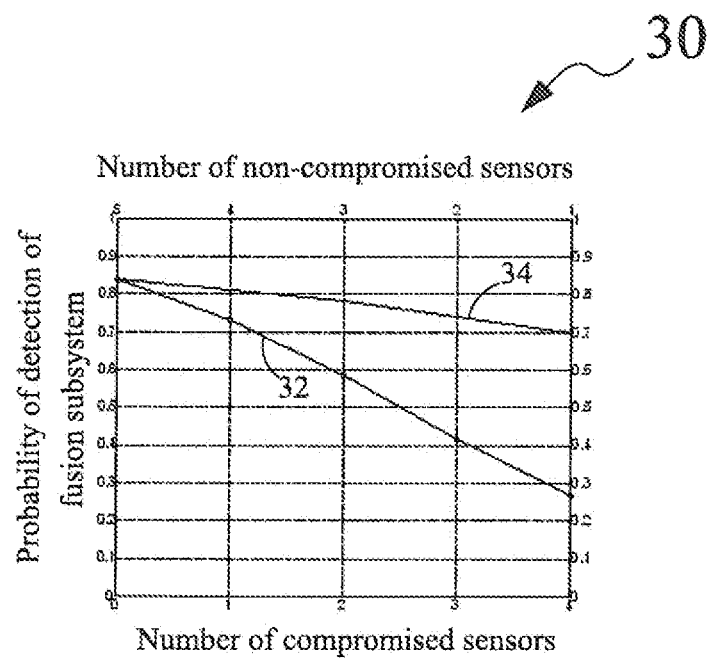
FIG. 4 illustrates a graph depicting a decrease in the probability of detection of the fusion subsystem with the increase in the count of compromised sensors.

Even with the simplifications such as equally probable events and homogeneous sensors, an analytical form of the equation (18) is difficult to obtain. Therefore, numerically the probability of detection of the fusion subsystem 160 is calculated and is plotted as a function of the number of compromised sensors, as depicted in FIG. 4. Specifically, FIG. 4 illustrates a graph 30 depicting a decrease in the probability of detection of the fusion subsystem 160 as the count of compromised sensors increases (as depicted by a line 32) for M=5 (total count of sensors 122) and $P_d$=0.9. As observed from FIG. 4, the QoI of the fusion subsystem 160 degrades significantly when the percentage of compromised sensors (as depicted by x-axis of the graph 30) increases. As also demonstrated in FIG. 4, if the compromised sensors may be identified from the sensors 122 and respective reports of such sensors are discarded in the fusion process performed by the fusion subsystem 160, the QoI of the fusion subsystem 160 is greatly improved, as depicted by comparing the line 32 with a line 34 that depicts fusion without any compromised sensors.

Figure 5:
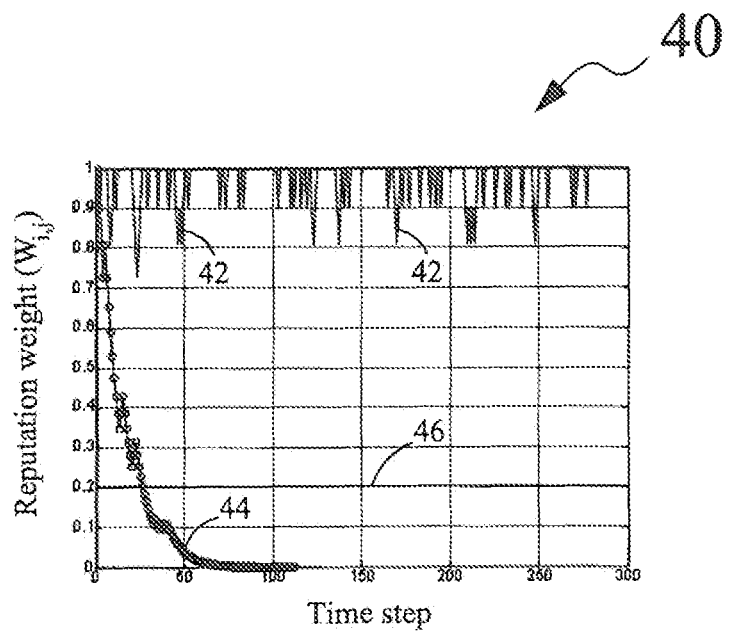
FIG. 5 illustrates a graph depicting a pattern of weightages for the non-compromised and the compromised sensors for a second set of conditions.

Moreover, it is assumed that only a small fraction of sensors of the sensors 122 is compromised. As the percentage of the compromised sensors increases, the false reports corresponding to the decisions of the sensors weigh over the non-compromised sensors. As a result, the performance of the system 100 for the decision fusion degrades. For example, FIG. 5 illustrates a graph 40 depicting a pattern of weightages for non-compromised and compromised sensors for a second set of conditions wherein 8 out of 15 sensors are compromised ($M^{Fau}=8$). Accordingly, the evolution trends of the weights of non-compromised and compromised sensors reverse when compared to FIG. 3. Specifically, peaks 42 represent weights for compromised sensors, a curve 44 represents weights for non-compromised sensors, and line 46 represents the first threshold value "$W_{Thr}$". As observed from FIG. 5, the weight of a non-compromised sensor decreases and eventually converges to 0; while the weight of a compromised sensor fluctuates from 1 with certain deviation.

In addition to the malicious behavior of one or more sensors of the sensors 122, one or more channels of the channels 140 may also suffer from channel fading and noise as mentioned above. Accordingly, each decision $u_i$ of the each sensor of the sensors 122 is transmitted through a fading channel of the channels 140 and the output of the channel for the ith sensor is:

$$y_i = h_i u_i + n_{ci} \quad (20)$$

In the above equation (20), $h_i$ denotes a real valued fading envelop with $h_i > 0$ (phase coherent reception); and $n_{ci}$ denotes zero mean Gaussian noise with variance $\sigma_c^2$.

Assuming a complete knowledge regarding the fading channel and the QoI of the sensors 122, an optimal fusion rule has the following form:

$$\prod_{i=1}^{M} \frac{P_{d_i} e^{\frac{-(y_i-h_i)^2}{2\sigma_c^2}} + (1-P_{d_i})e^{\frac{-(y_i+h_i)^2}{2\sigma_c^2}}}{P_{f_i} e^{\frac{-(y_i-h_i)^2}{2\sigma_c^2}} + (1-P_{f_i})e^{\frac{-(y_i+h_i)^2}{2\sigma_c^2}}} \gtrless 1. \quad (21)$$

Based on the foregoing, the optimal fusion rule jointly considers the effects of the fading channels of the channels 140 and the QoI of the sensors 122 to achieve an optimal performance. Accordingly, the updated weights are incorporated into the fusion process performed by the fusion subsystem 160 at the time step "j+1" based on the following:

$$\prod_{i=1}^{M} \left\{ \frac{P_{d_i} e^{\frac{-(y_i-h_i)^2}{2\sigma_c^2}} + (1-P_{d_i})e^{\frac{-(y_i+h_i)^2}{2\sigma_c^2}}}{P_{j_k} e^{\frac{-(y_i-h_i)^2}{2\sigma_c^2}} + (1-P_{f_i})e^{\frac{-(y_i+h_i)^2}{2\sigma_c^2}}} \right\}^{W_{i,j}} \gtrless 1 \quad (22)$$

Figure 6:
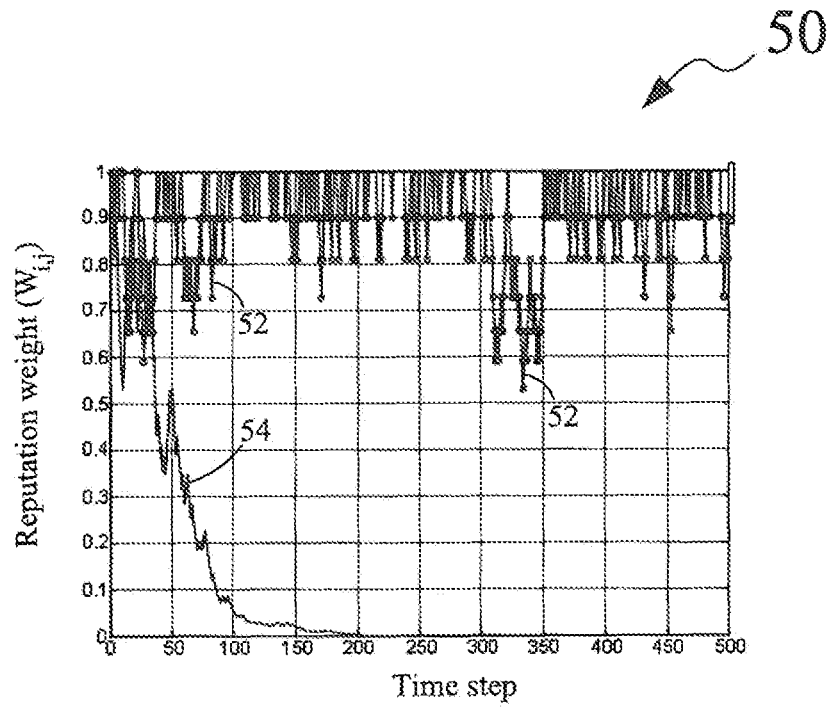
FIG. 6 illustrates a graph depicting a pattern of weightages for the non-compromised and the compromised sensors for a third set of conditions.
Figure 7:
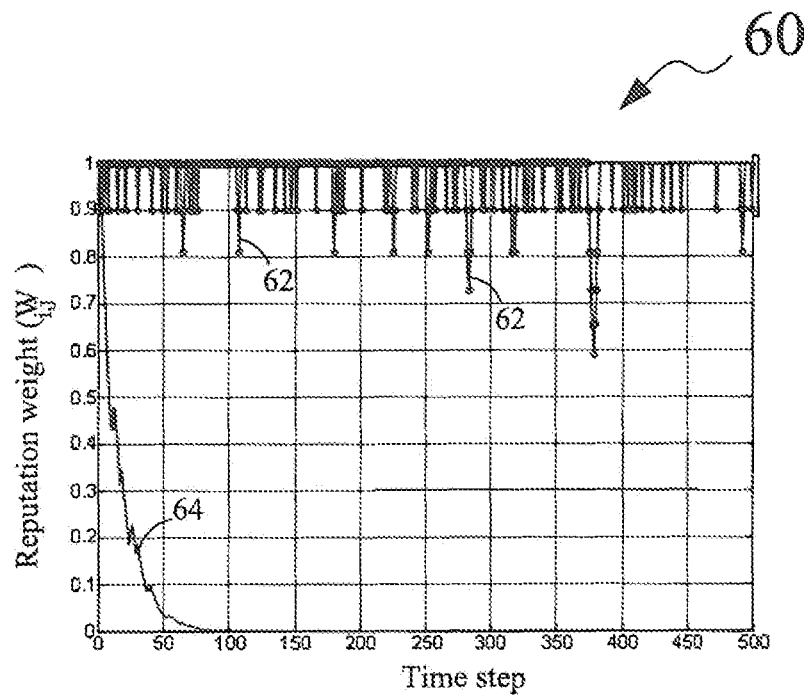
FIG. 7 illustrates a graph depicting a pattern of weightages for the non-compromised and the compromised sensors for a fourth set of conditions.

Furthermore, the evolution of the pre-determined weightage $W_{ij}$ with the time step "j" is observed by simulating and plotting for both the non-compromised and the compromised sensors of the sensors 122, as depicted in FIGS. 6 and 7. More specifically, FIG. 6 illustrates a graph 50 depicting a pattern of weightages for the non-compromised and the compromised sensors for a third set of conditions and FIG. 7 illustrates a graph 60 depicting a pattern of weightages for the non-compromised and the compromised sensors for a fourth set of conditions. Further, for simulation, 15 of the sensors 122 (M=15) with 3 sensors being compromised ($M^{Fau}=3$) are taken. For simplicity, it is assumed that signal vector, $s_i=1$; and the each sensor experiences the same variance of measurement errors, i.e., $\sigma=0.5$. As depicted in FIG. 6, the SNR is set at −10 decibel (dB); while in FIG. 7, the SNR is set at 0 dB. For FIG. 6, peaks 52 depict weights for non-compromised sensors and a curve 54 depicts weights for compromised sensors. Similarly, peaks 62 depict weights for non-compromised sensors and a curve 64 depicts weights for compromised sensors in FIG. 7. As observed from FIGS. 6 and 7, for SNR=−10 dB, the pre-determined weightage $W_{i,j}$ of the compromised sensor converges to 0 at a slower rate, in comparison to that at SNR=0 dB.

According to another embodiment of the system 100 of the present disclosure, the each sensor of the sensors 122 and the fusion subsystem 160 interact repeatedly for a pre-determined duration. For example, within a stage game $t_k$, the fusion subsystem 160 and a sensor "i" interact repeatedly for duration of "T" seconds. The assumption of multiple interactions within a stage game allows the fusion subsystem 160 to infer about the behavior of the sensor "i". Further, a history of the game is denoted as hist ($t_k$), as the history of the game available to the fusion subsystem 160 at the beginning of the stage game $t_k$. The compromised sensors (adversary) aim at degrading reliable event detection by the fusion subsystem 160, while either evading detection or minimizing probability of being detected by the fusion subsystem 160. Accordingly, the payoff to the adversary is disrupting communication between the sensors 122 and the fusion subsystem 160. Further, it is assumed that the adversary adopts probabilistic attack model to minimize the probability of being detected (i.e., maximize the detection delay). Specifically, the compromised sensors exhibit malicious behavior with probability less than 1. The probabilistic attack model may then be represented as, $$u_i^f = \begin{cases} -u_i & \text{with prob. of } P_{mal} \\ u_i & \text{with prob. of } 1-P_{mal} \end{cases} \quad (23)$$

In the above equation (23), $u_i^f$ is a maliciously modified sensor decision, $P_{mal}$ is probability of malicious behavior (as adversary transmits correct decision with probability $1-P_{mal}$). Accordingly, it is important to note that by adopting a probabilistic attack model, the adversary attempts to mimic an inherent uncertainty of a measurement environment and communication channel of the channels 140. On the contrary, the fusion subsystem 160 attempts to maximize the probability of detection of the event based on detection capability and behavior of the each sensor of the sensors 122. Therefore, the fusion subsystem 160 aims at providing reliable and efficient event detection in the presence of malicious adversary. That is, the goal at the fusion subsystem 160 is to maximize the probability of event detection. The event detection probability at the fusion subsystem 160 is determined by the detection capability of the each sensor and also by the behavior of the each sensor. The detection problem at the fusion subsystem 160 may be formulated as a maxmin problem, $$\max_{P_{d_i}} \min_{P_{mal}} P_d^{Fus}(P_{d_i}, P_{mal}) \quad (24)$$

subject to:

$$0 < P_{d_i} < 1$$

$$0 < P_{mal} < 1$$

In the above equation (24), $P_{di}$ is detection probability at the sensor "i", $P_{mal}$ captures the behavior of the each sensor. Thus, a rational and intelligent fusion subsystem 160 conditions communications with the each sensor, based on an established level of trust.

According to yet another embodiment of the system 100 of the present disclosure, the fusion subsystem 160 is further configured to ascertain a probability measure corresponding to a belief about trustworthiness and reputation of the each sensor of the sensors 122 at a plurality of instances based on prior history of the belief for the each sensor. For example, the type of the sensor "i" is denoted by $\theta_i$, where $\theta_i \in \{\theta_0 = \text{malicious}, \theta_1 = \text{non-malicious}\}$ sensor type. Further, malicious corresponds to compromised sensors and non-malicious corresponds to the non-compromised sensors. The set $\Theta_i = \{\theta_0, \theta_1\}$ defines the type space of the sensor "i", which is also the global type space, since a sensor belongs to either the set of compromised sensors or the set of non-compromised sensors.

Although, the behavior of the each sensor is private information, the fusion subsystem 160 assigns a probability measure over the type space of the each sensor. Such probability defines the fusion subsystem's 160 belief about the trustworthiness of the each sensor. The belief of the fusion subsystem 160 at stage game $t_k$ about the behavior of the sensor "i" is denoted by $\mu_i^{Fus}$. That is, $$\mu_i^{Fus}(t_k) = P(\theta_i | \text{hist}(t_k)), \quad (25)$$

In the above equation (25), $\text{hist}(t_k)$ is the history of the game at the beginning of the stage game $t_k$. At the end of the stage game $t_k-1$, the fusion subsystem 160 updates belief thereof using Bayes rule to determine the belief for the next stage, $$\mu_i^{Fus} = \frac{p(\text{hist}(t_k) | \theta_i) p(\theta_i)}{\sum_{\theta_i' \in \Theta} p(\text{hist}(t_k) | \theta_i') p(\theta_i')} \quad (26)$$

In the above equation (26), $p(\theta_i)$ is prior belief. Further, $\mu_i^{Fus}$ as calculated may be used as prior belief for the next stage game. It is intuitive to assume that after a finite stage of the game, the belief converges to a value that characterizes the trustworthiness or the reputation of the each sensor, as denoted by $\mu_i$. The optimal data fusion rule may then be modified to incorporate the reputation of the sensor "i", $$f(u_1, \ldots, u_M) = \begin{cases} 1 & \text{if } a_0 + \sum_{i=1}^{M} \mu a_i u_i > 0; \\ -1 & \text{otherwise.} \end{cases} \quad (27)$$

Accordingly, maximizing $P_d^{Fus}$ amounts to selecting sensors with high reputation, i.e., the fusion subsystem 160 is adapted to communicate with one or more sensors of the sensors 122 having at least one of a pre-determined trustworthiness and reputation in order to maximize a probability of detection of the fusion subsystem 160. In the event where reputation of some sensors falls below a certain threshold, the fusion subsystem 160 triggers an alarm for deployment of additional sensors when at least one of the trustworthiness and the reputation of the each sensor of the sensors 122 falls below a third threshold value. The third threshold value may be defined as per the requirements of the system 100 within a network.

Figure 8:
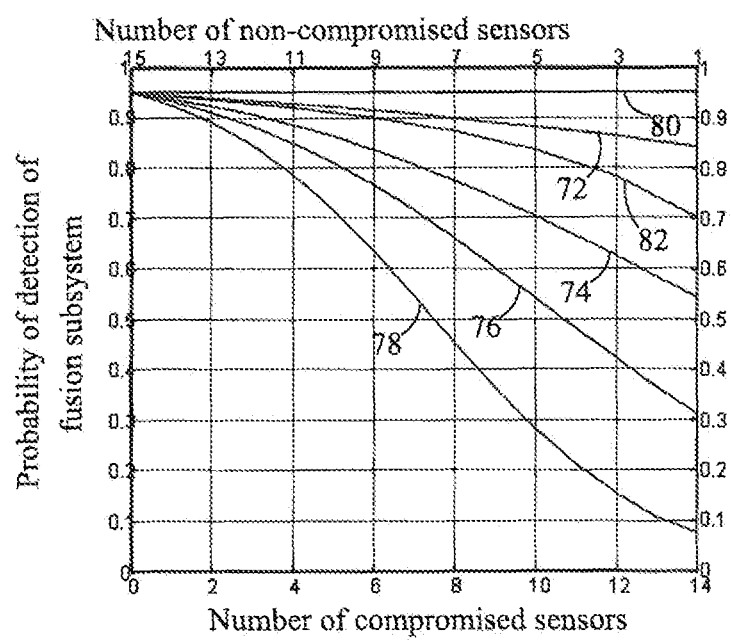
FIG. 8 illustrates a graph depicting the probability of detection of the fusion subsystem as a function of the count of compromised sensors and a probability of malicious behavior.

Further, the effect of the probability of malicious behavior on the fusion rules and the probability of detection of the fusion subsystem 160 is evaluated, as depicted in FIG. 8. Specifically, FIG. 8 illustrates a graph 70 depicting the probability of detection of the fusion subsystem 160 as a function of the count of compromised sensors and a probability of malicious behavior. More specifically, FIG. 8 depicts the case wherein the detection capability of the fusion subsystem 160 may be limited by the QoI of the sensors ($P_{di}$) when there are no adversarial sensors ($P_{mal}=0$). For a given $P_{di}$, the performance degrades as the level of maliciousness increases. For instance, at $P_{mal}=0.2$ (as depicted by a curve 72) and M=8, the performance degrades by about 5% with respect to the case where $P_{mal}=0$. Further, curves 74, 76, 78, and 80 represent probability of detection for the fusion subsystem 160 at $P_{mal}=0.5$, $P_{mal}=0.7$, $P_{mal}=1$, and $P_{mal}=0.1$, respectively. Furthermore, a curve 82 is a representation for fusion only with non-compromised sensors.

Accordingly and as observed, $P_d^{Fus}$ exhibits performance gain of about 2% with respect to the case where only non-compromised sensors contribute to the fusion process performed by the fusion subsystem 160. In other words, if the fusion subsystem 160 is designed to tolerate some level of malicious behavior, significant performance improvement may be attained. Indeed, tolerating some level of misbehavior may account for sensors that may intermittently exhibit non-malicious but faulty behavior. Further, it may also account for variations in channel conditions. It is important to note that detecting low probability of malicious behavior may incur longer detection delay that increases the overhead in the fusion subsystem 160. It is easy to see that for values of $P_{mal} \geq 0.5$, the detection capability of the fusion subsystem 160 significantly degrades. For M=8 and $P_{mal}=0.5$ (as depicted by the curve 74), the amount of incurred degradation is about 18% with respect to the case where there are no malicious sensors ($P_{mal}=0$). It is evident that in the presence of adversarial sensors with deterministic malicious behavior, $P_d^{Fus}$ exhibits severe performance degradation. That is, at $P_{mal}=1.0$ the performance degradation is about 52% (as depicted by the curve 78). Since effects of deterministic malicious behavior may easily be detected, an adversary may refrain from such strategy.

Figure 9A:
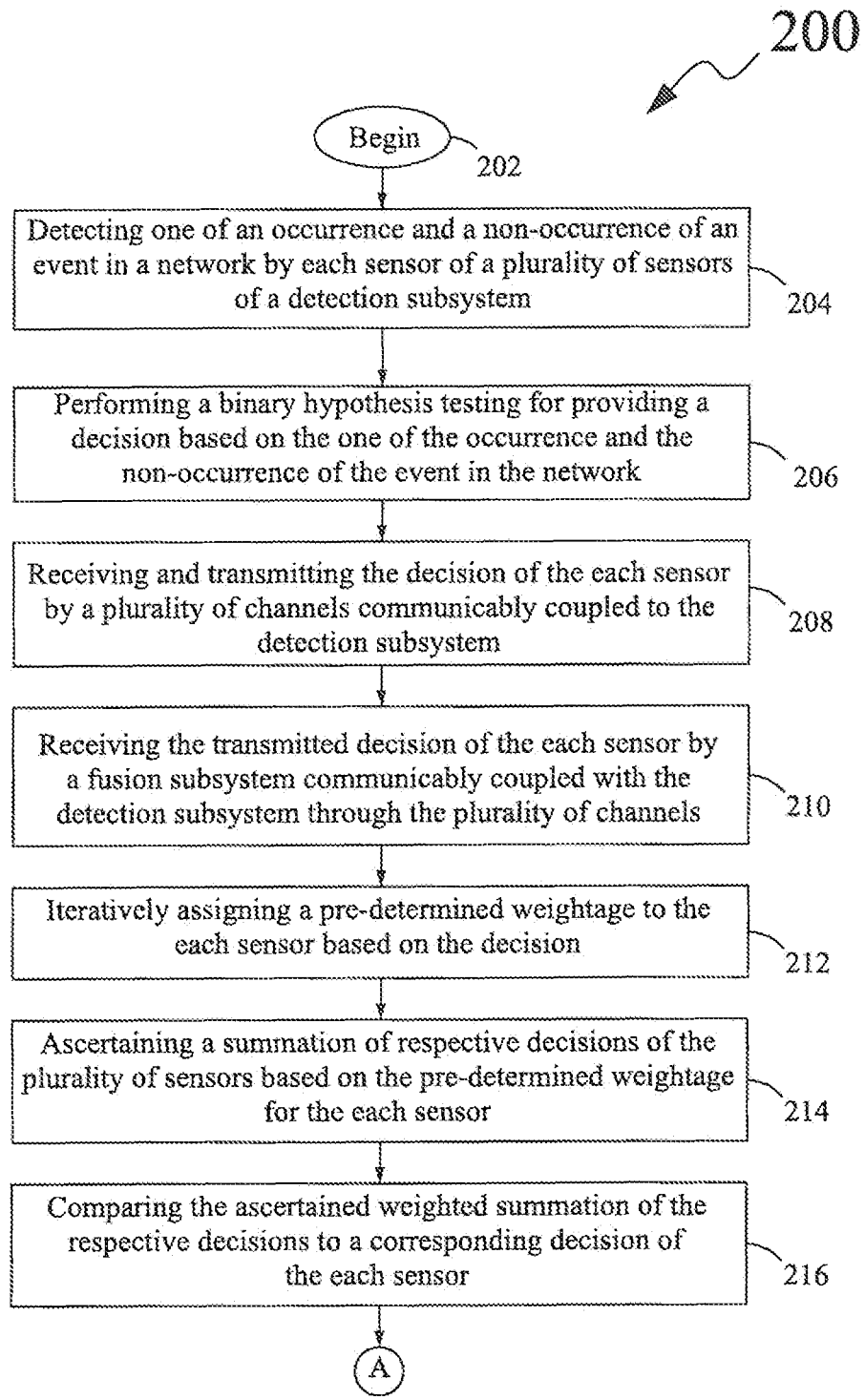
FIGS. 9A and 9B illustrate a flow diagram depicting a method for decision fusion in a network using the trust management system of FIG. 1.
Figure 9B:
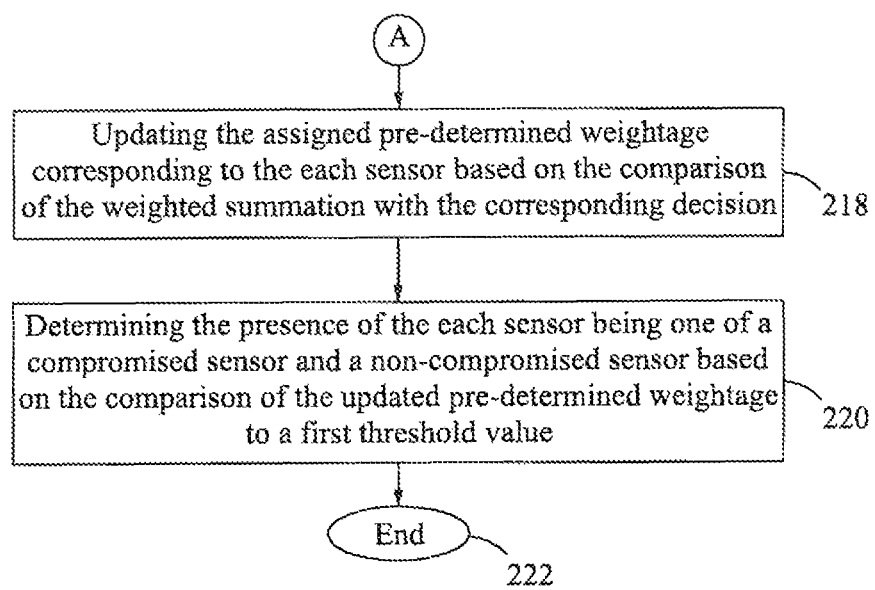

In another aspect, the present disclosure provides a method for decision fusion in a network using a trust management system, such as the system 100 of FIG. 1. Specifically, FIGS. 9A and 9B illustrate a flow diagram depicting a method 200 for decision fusion in a network using the system 100. Further, the method 200 is explained in reference to the system 100 and components thereof, as depicted in FIG. 1. Also and described above, the term, 'network' as used herein above and below may be one of a social-cognitive network, an information network and a communication network.

The method 200 begins at 202. At 204, one of an occurrence and a non-occurrence of an event in the network is detected by the each sensor of the sensors 122 of the detection subsystem 120. At 206, a binary hypothesis testing is performed for providing a decision by the each sensor based on the one of the occurrence and the non-occurrence of the event in the network. Specifically, apriori probabilities of the one of the occurrence and the non-occurrence of the event are ascertained based on the binary hypothesis testing. Thereafter, a rule to make a decision corresponding to the one of the occurrence and the non-occurrence of the event is employed. Subsequently, a second threshold value, such as the second threshold value as described in conjunction with reference to the system 100 of FIG. 1, is ascertained utilizing the ascertained apriori probabilities of the one of the occurrence and the non-occurrence of the event. Further, a probability of detection and a probability of false alarm are then ascertained corresponding to the one of the occurrence and the non-occurrence of the event.

At 208, the decision of the each sensor is received and transmitted by the channels 140 that are communicably coupled to the detection subsystem 120. At 210, the transmitted decision of the each sensor is received by the fusion subsystem 160 that is communicably coupled with the detection subsystem 120 through the channels 140. Further, the decision of the each sensor of the sensors 122 may be transmitted in the form of a report to the fusion subsystem 160.

At 212, a pre-determined weightage is iteratively assigned to the each sensor based on the decision. Accordingly, when the decision of the each sensor of the sensors 122 is transmitted in the form of the report to the fusion subsystem 160, the report may correspond to the assigned pre-determined weightage of the each sensor. As described above, the term, 'assigned pre-determined weightage' corresponds to trustworthiness and reliability of the decision of the each sensor. At 214, a summation of respective decisions of the sensors 122 is ascertained based on the pre-determined weightage for the each sensor.

At 216, the ascertained weighted summation of the respective decisions is compared to a corresponding decision of the each sensor. At 218, the assigned pre-determined weightage corresponding to the each sensor is updated based on the comparison of the weighted summation with the corresponding decision. At 220, the presence of the each sensor being one of a compromised sensor and a non-compromised sensor is determined based on the comparison of the updated pre-determined weightage to the first threshold value as explained above for the system 100 of FIG. 1.

The method 200 also includes detection of the one of the occurrence and the non-occurrence of the event in the network by mapping a plurality of information sources associated with the network. Each information source of the plurality of information sources is one of a person, a sensor and a database query.

The method 200 also includes ascertaining a probability of detection of the fusion subsystem 160. The ascertained probability of detection of the fusion subsystem 160 corresponds to a function of a count of compromised sensors of the sensors 122. The method 200 ends at 222.

The present disclosure provides an efficient and effective tool to manage trust for decision fusion within a network while considering effect of compromised sensors, and fading and noisy communication channels. Further, the present disclosure addresses the threats of the compromised sensors, and the fading and noisy communication channels, in order to improve performance of a fusion process within the network by introducing a reputational mechanism. In particular, the fusion process takes the "trustworthiness" of a report of a corresponding sensor into consideration to perform robust and accurate data aggregation while providing analytical frameworks to model malicious behavior of the compromised sensors.

As such, the present disclosure provides a trust management system (i.e., the system 100) and a method (i.e., the method 200) for decision fusion in a network. The trust management system and the method employ efficient reputation mechanism to concentrate on accurately quantifying the legitimate or malicious behavior of sensors; and efficient fusion algorithms (rules) for maintaining reliable, accurate and efficient event detection in the presence of adversaries by utilizing the reputation mechanism. Further, the trust management system and the method of the present disclosure employ analysis and simulation to evaluate the effect of the reputational mechanism and fusion algorithms to improve the metrics of quality of information (QoI) for the fusion process. Furthermore, the results obtained by analysis and simulation provide valuable insights into dynamics of interplay between information network, communication network and decision making support in social-cognitive network.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A trust management system for decision fusion in a network, the trust management system comprising:

a detection subsystem comprising a plurality of sensors, each sensor of the plurality of sensors configured to detect one of an occurrence and a non-occurrence of an event in the network, the each sensor of the plurality of sensors further configured to perform a binary hypothesis testing for providing a decision based on the one of the occurrence and the non-occurrence of the event in the network;

a plurality of channels, each channel of the plurality of channels communicably coupled to a corresponding sensor of the detection subsystem to receive the decision from the corresponding sensor and to further transmit the received decision; and a fusion subsystem communicably coupled to the detection subsystem through the plurality of channels for receiving the transmitted decision of the each sensor and iteratively assigning a pre-determined weightage to the each sensor based on the decision, the fusion subsystem configured to ascertain a summation of respective decisions of the plurality of sensors based on the pre-determined weightage for the each sensor and to compare the weighted summation of the respective decisions to a corresponding decision of the each sensor, the fusion subsystem further configured to update the assigned pre-determined weightage corresponding to the each sensor based on the comparison of the weighted summation with the corresponding decision, and to determine the presence of the each sensor being one of a compromised sensor and a non-compromised sensor based on the comparison of the updated pre-determined weightage to a first threshold value.

2. The trust management system of claim 1, wherein the network is one of a social-cognitive network, an information network and a communication network.

3. The trust management system of claim 1, wherein the each sensor of the plurality of sensors further detects the one of the occurrence and the non-occurrence of the event in the network by mapping a plurality of information sources associated with the network, and wherein each information source of the plurality of information sources is one of a person, a sensor and a database query.

4. The trust management system of claim 1, wherein the each sensor is further configured to,
ascertain apriori probabilities of the one of the occurrence and the non-occurrence of the event based on the binary hypothesis testing,
employ a rule to make a decision corresponding to the one of the occurrence and the non-occurrence of the event,
ascertain a second threshold value utilizing the ascertained apriori probabilities of the one of the occurrence and the non-occurrence of the event, and
ascertain a probability of detection and a probability of false alarm corresponding to the one of the occurrence and the non-occurrence of the event.

5. The trust management system of claim 1, wherein the decision of the each sensor of the plurality of sensors is transmitted in the form of a report to the fusion subsystem.

6. The trust management system of claim 5, wherein the report corresponds to the assigned pre-determined weightage of the each sensor of the plurality of sensors, and wherein the assigned pre-determined weightage corresponds to trustworthiness and reliability of the decision of the each sensor of the plurality of sensors.

7. The trust management system of claim 1, wherein the fusion subsystem is further configured to ascertain a probability of detection of the fusion subsystem, wherein the ascertained probability of detection of the fusion subsystem corresponds to a function of a count of compromised sensors of the plurality of sensors.

8. The trust management system of claim 1, wherein the each sensor of the plurality of sensors is determined to be a compromised sensor when the updated pre-determined weightage of the each sensor is below the first threshold value.

9. The trust management system of claim 1, wherein the fusion subsystem is further configured to ascertain a probability measure corresponding to belief about trustworthiness and reputation of the each sensor of the plurality of sensors at a plurality of instances based on prior history of the belief for the each sensor.

10. The trust management system of claim 9, wherein the fusion subsystem is adapted to communicate with one or more sensors of the plurality of sensors having at least one of a pre-determined trustworthiness and reputation in order to maximize a probability of detection of the fusion subsystem.

11. The trust management system of claim 10, wherein the fusion subsystem triggers an alarm for deployment of additional sensors when at least one of the trustworthiness and the reputation of the each sensor of the plurality of sensors falls below a third threshold value.

12. The trust management system of claim 1, wherein the each sensor of the plurality of sensors and the fusion subsystem interact repeatedly for a predetermined duration.

13. The trust management system of claim 12, wherein the plurality of sensors comprises one or more compromised sensors attempting to minimize the probability of being detected by the fusion subsystem.

14. The trust management system of claim 12, wherein the fusion subsystem attempts to maximize the probability of detection of an event based on detection capability and behavior of the each sensor of the plurality of sensors.

15. A method for decision fusion in a network using a trust management system comprising a detection subsystem, a plurality of channels and a fusion subsystem, the method comprising:
detecting one of an occurrence and a non-occurrence of an event in the network by each sensor of a plurality of sensors of the detection subsystem;
performing a binary hypothesis testing for providing a decision based on the one of the occurrence and the non-occurrence of the event in the network;
receiving and transmitting the decision of the each sensor by the plurality of channels communicably coupled to the detection subsystem;
receiving the transmitted decision of the each sensor by the fusion subsystem communicably coupled with the detection subsystem through the plurality of channels;
iteratively assigning a pre-determined weightage to the each sensor based on the decision;
ascertaining a summation of respective decisions of the plurality of sensors based on the pre-determined weightage for the each sensor;
comparing the ascertained weighted summation of the respective decisions to a corresponding decision of the each sensor;
updating the assigned pre-determined weightage corresponding to the each sensor based on the comparison of the weighted summation; and
determining the presence of the each sensor being one of a compromised sensor and a non-compromised sensor based on the comparison of the updated pre-determined weightage to a first threshold value.

16. The method of claim 15, wherein the network is one of a social-cognitive network, an information network and a communication network.

17. The method of claim 15, further comprising detecting the one of the occurrence and the non-occurrence of the event in the network by mapping a plurality of information sources associated with the network, and wherein each information source of the plurality of information sources is one of a person, a sensor and a database query.

18. The method of claim 15, further comprising,
ascertaining apriori probabilities of the one of the occurrence and the non-occurrence of the event based on the binary hypothesis testing;
employing a rule to make a decision corresponding to the one of the occurrence and the non-occurrence of the event;
ascertaining a second threshold value utilizing the ascertained apriori probabilities of the one of the occurrence and the non-occurrence of the event; and
ascertaining a probability of detection and a probability of false alarm corresponding to the one of the occurrence and the non-occurrence of the event.

19. The method of claim 15, further comprising ascertaining a probability of detection of the fusion subsystem, wherein the ascertained probability of detection of the fusion subsystem corresponds to a function of a count of compromised sensors of the plurality of sensors.

20. The method of claim 15, wherein the decision of the each sensor of the plurality of sensors is transmitted in the form of a report to the fusion subsystem, wherein the report corresponds to the assigned pre-determined weightage of the each sensor of the plurality of sensors, and wherein the assigned pre-determined weightage corresponds to trustworthiness and reliability of the decision of the each sensor of the plurality of sensors.

\* \* \* \* \*